J. G. CALLAN.
COOLING DYNAMO ELECTRIC MACHINES.
APPLICATION FILED APR. 23, 1906.
920,725. Patented May 4, 1909.
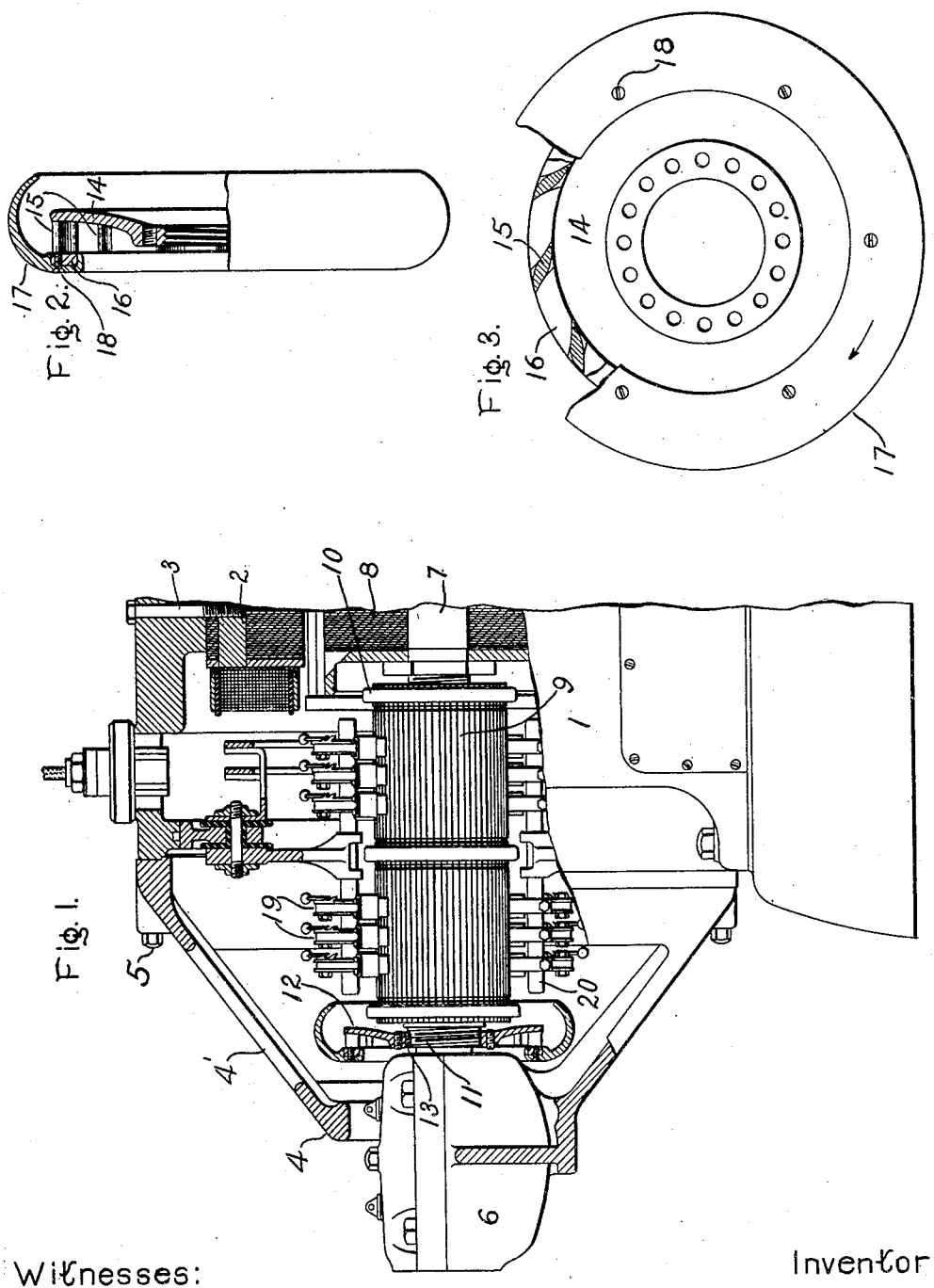
Witnesses:
Burchard V. Kelley
Helen Axford
Inventor:
John G. Callan.
by Albert G. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

COOLING DYNAMO-ELECTRIC MACHINES.

No. 920,725.  Specification of Letters Patent.  Patented May 4, 1909.

Application filed April 23, 1906. Serial No. 313,149.

*To all whom it may concern:*

Be it known that I, JOHN G. CALLAN, a citizen of the United States, residing at Lynn, county of Essex, State of Massachusetts, have invented certain new and useful Improvements in Cooling Dynamo-Electric Machines, of which the following is a specification.

My present invention has for its object the provision of a simple and effective means for cooling dynamo electric machines and particularly for cooling the current collecting devices of such machines.

The various features of novelty which characterize my invention are pointed out with particularity in the claims annexed to and forming a part of this specification.

For a better understanding of my invention and the advantages possessed by it, reference may be had to the accompanying drawings and descriptive matter in which I have illustrated one of the forms in which my invention may be embodied.

Figure 1 is an elevation partly broken away and in section of a portion of a dynamo electric machine; Fig. 2 is an elevation on a larger scale than Fig. 1 partly broken away and in section of the fan and guard employed; and Fig. 3 is a view taken at right angles to Fig. 2 also partly broken away and in section.

Referring to the drawings, 1 represents the frame work of a horizontal shaft dynamo electric machine which in the form shown is a high speed direct current generator adapted to be directly connected to a horizontal shaft steam turbine.

The field poles 2 are secured to the inner side of the field rings by bolts 3. An end member or bonnet 4 having openings or windows 4' formed in it is secured against the commutator end of the field ring by bolts 5. The bonnet 4 carries a bearing box 6 in which is journaled one end of the armature shaft 7. Between the armature 8 proper and bearing box 6, the shaft 7 supports the commutator, which in the form shown has its conducting bars 9 secured in place by shrink rings 10. The end 11 of the commutator shell or support adjacent the bearing box 6 is threaded exteriorly. On this threaded end is secured a fan wheel 12. After the fan wheel 12 is screwed home it may be secured in place by a threaded pin 13 screwed into a threaded recess formed partly in the shell and partly in the fan wheel.

The fan wheel 12 which may be made of cast steel or the like comprises a dished disk or body portion 14. Axially extending blades 15 project from the outer side of the body portion 14 near its periphery. The ends of the blades 15 remote from the body portion 14 are integrally connected together by an annular member or portion 16. An annular deflector member 17 approximately arc shaped in cross-section, is formed with a recess in its concave side into which the annular portion 16 is received. The deflector 17 is secured to the annular member 16 by screws 18.

When the armature shaft 7 and fan wheel 12 rotate in the direction indicated by the arrow in Fig. 3, the blades 15 cause air to move outward through the space between the blades. This air strikes the inner surface of the deflector member 17 and is reversed in direction thereby and thrown down upon the surface of the commutator. The speed of the air currents thus set in motion and the direction given to them by the deflector when the fan blades and the deflector are properly designed and proportioned, is such as to cause a rapid and powerful circulation of air axially along a large proportion of the total external surface of the commutator. These air currents effectively cool the commutator bars and also the brushes 19 which are carried by a suitable supporting yoke 20. The air currents also tend to prevent arcing between the brushes and the commutator bars. The cooling thus produced, is highly desirable, particularly with machines of the character described in which the speeds of the prime movers are so high that the commutators are necessarily made relatively small in order to limit their peripheral speeds. On account of this limitation it is of course, desirable to run the current density carried by the individual commutator bars as high as it is possible to do without injuriously affecting their efficiencies and operation.

I have found it advantageous to shape the blades in the manner shown in which the front face of each blade having reference to the direction of rotation of the fan wheel, is reversely curved, the convex portion of the surface being at the outer edge of the blade and the concave portion at the inner edge of the blade, and the rear surface of the blade is also reversely curved, but with its concave portion at the outer edge of the blade and the convex portion at the inner edge. The inner and outer edges of each blade are thus practically tangential to the circles touched by them and are wedge-shaped in cross-section. I also find it advantageous to make the bodies of the blades materially thicker than the edges, thus reducing any tendency of the blades to vibrate. With the fan blades and deflector constructed and proportioned as shown, a highly efficient and practically noiseless fan action is obtained.

While the particular construction disclosed has been found to give excellent results in practice, it will be readily understood by those skilled in the art that changes may be made in the form of my invention without departing from its spirit.

What I claim as new and desire to secure by Letters Patent of the United States, is,—

1. In combination, a rotating shaft, a member of a dynamo-electric machine carried thereby, a fan member also carried by the shaft, said fan member comprising vanes or blades moving air outwardly from the shaft, and a curved deflector member substantially arc-shaped in cross-section whereby the air moved outwardly by the blades is reversed in direction and discharged against said member of the dynamo-electric machine.

2. In combination, a rotating shaft, a current collecting device, blades or vanes moving air outwardly from the shaft, and a curved deflector member all carried by the shaft, said deflector member being substantially arc-shaped in cross-section whereby the air moved outwardly by the blades is reversed in direction and discharged against the current collecting device.

3. In combination, a rotating shaft, a current collecting device carried thereby, a fan member also carried by the shaft, said fan member comprising a disk like body portion, an annular deflector member, and blades extending axially between said body member and said deflector member, said deflector member being arranged so that the air moved outwardly by the fan blades engages it, and is deflected thereby against said current collecting device.

4. In combination, a rotating commutator comprising a shell member and bars, a fan wheel secured to the end of the shell member and provided with vanes or blades which discharge air outwardly, and a deflector, secured to the fan wheel and arranged to cause the air currents set in motion by the blades to be deflected against the surface of the commutator.

5. In combination, a rotating shaft, a current collecting device carried thereby, a fan also carried by the shaft, comprising a disk like body portion, blades extending axially from said body portion, an annular member integrally connecting the ends of the blade remote from the body portion, and a curved deflector member formed with grooves in which said annular member is received, said deflector member being substantially arc-shaped in cross-section whereby air moved outward by the fan blades is reversed in direction and discharged against said current collecting device.

6. In combination, a rotating shaft, a member of a dynamo-electric machine carried thereby, a fan wheel also carried by the shaft, said fan wheel comprising vanes or blades moving air outwardly from the shaft, and a member secured to the fan wheel arranged to deflect the air moved outwardly by the blades and discharge it against said rotating member of the dynamo-electric machine.

7. In combination, a rotating shaft, a member of a dynamo-electric machine carried thereby, a fan member also carried by the shaft, said fan member comprising vanes or blades moving air outwardly from the shaft, and a curved deflector member substantially arc-shaped in cross-section, arranged to deflect the air moved outwardly by the fan blades and discharge it against the rotating member of the dynamo-electric machine.

8. In combination, a rotating shaft, a member of a dynamo-electric machine carried thereby, a fan member also carried by the shaft, said fan member comprising a disk like body portion, an annular curved deflector member and blades extending axially between said body portion and said deflector member, being substantially arc-shaped in cross-section, whereby the air moved outwardly by the blades is reversed in direction and discharged against said member of the dynamo-electric machine.

In witness whereof, I have hereunto set my hand this twentieth day of April, 1906.

JOHN G. CALLAN.

Witnesses:
JOHN A. McMANUS, Jr.,
HENRY O. WESTENDARP.